United States Patent [19]
Gray

[11] 3,939,874
[45] Feb. 24, 1976

[54] EXTERNAL PIPE COATINGS FOR A REINFORCED PIPE

[75] Inventor: David Gray, Newcastle, England

[73] Assignee: British Gas Corporation, London, England

[22] Filed: Feb. 19, 1974

[21] Appl. No.: 443,746

[30] Foreign Application Priority Data
Feb. 27, 1973 United Kingdom........... 09486/73

[52] U.S. Cl. ............... 138/145; 138/153; 156/337; 428/468
[51] Int. Cl.² ....................... F16L 9/04; F16L 9/16
[58] Field of Search ........... 138/123, 125, 140, 145, 138/DIG. 2, 124, 118, 141; 161/175, 202; 174/110 N; 156/337

[56] References Cited
UNITED STATES PATENTS
2,828,798  4/1958  Hopkins et al................. 157/337 X Primary Examiner—Donald O. Woodiel
Assistant Examiner—Daniel M. Yasich
Attorney, Agent, or Firm—Larson, Taylor and Hinds

[57] ABSTRACT

Metal pipes are protected from corrosion by externally coating the pipe with a layer of coal tar and wrapping the pipe with at least one extensible material which is porous to allow the coal tar to pass through to form a layer on the outside. This type of wrap avoids any cracking of the protective materials during the commissioning and operation of the pipe.

6 Claims, No Drawings

EXTERNAL PIPE COATINGS FOR A REINFORCED PIPE

This invention relates to the wrapping of metal pipes with a suitable material for corrosion protection.

The purpose of coating the external surface of a pipeline is essentially to minimise the risk of corrosion and also to afford a certain amount of protection from mechanical damage. Historically, in the Gas Industry, coal tar or bitumen materials have been used for a great number of years. More recently, with an increase in the size of pipeline diameter, these enamels have been reinforced with glass fibre tissues to give added strength and also to enable the thickness of the enamel coating to be increased.

With the development of gas transmission to higher pressures using increasingly bigger pipelines, there has been a realisation that the above type of coating is not entirely satisfactory because it cannot withstand high tensile strains without cracking and this has resulted in a search for an improved coating material.

The major cause of coating failure is due to the inability of the coating to withstand high tensile strains. The coatings on the pipe need to withstand the severe handling which a pipe receives during laying, commissioning, and operation. In addition, the coating needs to be able to withstand such tests as pressure testing, soil movement and during cold bending in the field. It is essential that the coatings adheres strongly to the pipe surface if it is going to withstand the forces exerted on the pipeline and thus protect the metal surface from corrosion. This property is particularly important since the area of the pipeline beneath a disbonded coating, which may be associated with coating failure through cracking, is shielded from the influence of any cathodic protection. Another important property of the coating is that it should be thermally stable because under very heavy transmission loads anticipated the gas temperature at the outlet of a compressor station can be as high as 50°C. The coatings as well as being thermally stable must be chemically stable because of the possible attack from bacteria and chemicals contained in the surrounding soil. Another important property is that the coating must be reasonably impermeable to water if it is going to provide a satisfactory protection against corrosion.

Currently the material used for wrapping the pipes is a plastisised coal tar enamel, reinforced with glass fibre.

There have been cases of the coal tar enamel cracking when they have been subject to localised and excessive levels of tensile strain. These conditions have arisen as a result of ground movement, cold bending etc., of pipe and occassionally hydrostatic testing. It would appear that the ideal alternative to the present reinforcing tissue needs to possess properties of high ductility and mechanical properties which are compatible with coal tar enamel.

It is an object of the invention to try to overcome some or all of the above disadvantages.

According to the invention there is provided a method of protecting metal pipes by depositing a layer of coal tar on the external surface of the pipe and wrapping the coated surface with a layer of a longitudinally extensible material which can be synthetic organic polymer tissue or a glass based fabric.

Preferably the pipe is wrapped using layer or layers of coal tar, impregnated organic polymer tissue, and non-impregnated glass based material.

There is also a preferance of wrapping a pipe using combinations of the above materials.

Preferably the organic polymer tissue is a synthetic tissue which comprises a polyester/polyamide bi component filament yarn manufactured as a tissue fabric to 100 grams/meter$^2$ fabric weight prior to pre-impregnated with coal tar, resulting in a material with about 30% longitudinal extensibility.

Preferably the glass based materials is the knitted glass material which comprises a glass yarn of 204 filaments per yarn, i.e., 340 decitex knitted to 180 grams/meters$^2$ material weight resulted in a material with longitudinal extensibility of about 25%.

It is preferred that the metal pipes are cleaned before wrapping by either chemical or mechanical means.

To enable to advantage of the invention to be more clearly understood and solely by way of example one embodiment of the wrapping process is described.

The metal pipe is cleaned either chemically or mechanically to remove any oxides of scale formed on the outer surface. The pipe is then primed with a suitable paint. Coal tar is flooded onto the pipe and forms an inner layer of a required thickness and the knitted glass yarn is wound around the coal tar layer. An impregnated synthetic organic polymer tissue is wound around the outside of the layer of coal tar and this tissue is of a porous variety and consequently the coal tar passes through this layer and forms a further coal tar layer around the outside of the synthetic organic polymer tissue.

A table is shown below, showing that the inventive wrapping method using combinations of material mentioned in the specification that can stand appreciably higher strains than the conventional methods:

| WRAPPING SYSTEMS | | % STRAIN ON THE PIPE LEADING TO:- | |
|---|---|---|---|
| INNER LAYER | OUTER LAYER | SURFACE CRACKING | FAILURES |
| Knitted glass fabric | Pre-impregnated knitted glass fabric | 11 | 13.5 |
| none | Pre-impregnated Synthetic organic tissue | 20 | 36 |
| Knitted glass fabric | Pre-impregnated Synthetic organic tissue | 19.7 | 42 |
| Conventional Glass fibre tissue | Conventional pre-impregnated Glass fibre tissue. | 1.5 | 1.5 |

What is claimed is:
1. In a metal pipe for the transmission of a fluid under pressure, the exterior of said metal pipe being coated with a reinforced protective layer comprising coal tar for corrosion protection reinforced with a layer of reinforcement fiber, the improvement wherein resistance to cracking and failure of the protective layer due to strain on the metal pipe are increased by utilizing, as the reinforcement fiber, a layer of longitudinally extensible porous synthetic organic polymer tissue and a layer of longitudinally extensible glass based fabric, both of said layers of reinforcement fiber being wrapped around the pipe in contact with said coal tar layer whereby the coal tar passes freely through to form a second layer of coal tar on the outside of said organic polymer tissue.

2. An improved metal pipe according to claim 1 wherein, said layer of synthetic organic polymer tissue is pre-impregnated with coal tar.

3. An improved metal pipe according to claim 1 wherein said reinforcement fiber includes a further layer of longitudinally extensible knitted glass fabric reinforcement wrapped outside said metal pipe and a further coal tar layer interposed between the glass fabric reinforcement layers.

4. An improved metal pipe according to claim 3 wherein the outermost glass fabric reinforcement layer is pre-impregnated with coal tar.

5. A metal pipe according to claim 1 wherein the porous organic polymer tissue comprises a synthetic organic polymer tissue comprising a polyester/polyamide bi-component filament yarn manufactured as a tissue fabric to 100 grams/meters$^2$ fabric weight resulting in a material with approximately 30% longitudinal extension at a failure load of about 60 newtons/centimeters width.

6. A metal pipe according to claim 2 wherein the glass based material is a warp knitted - E glass yarn composed of 204 filaments per yarn, knitted to 180 grams/meters$^2$ fabric weight, resulting in a material with a longitudinal extensibility of about 25% and a failure load of about 20 newtons/centimeters width.

* * * * *